US008483716B1

(12) United States Patent
Albuquerque et al.

(10) Patent No.: US 8,483,716 B1
(45) Date of Patent: Jul. 9, 2013

(54) NETWORK AND LOCATION BASED PHONE NUMBER FORMAT IDENTIFICATION

(75) Inventors: Bruno Albuquerque, Belo Horizonte MG (BR); Rodrigo Damazio, Belo Horizonte MG (BR); Shaopeng Jia, Widen (CH); Lara Jane Rennie, Zurich (CH)

(73) Assignee: Google Inc., Mountain View, CA (US)

( * ) Notice: Subject to any disclaimer, the term of this patent is extended or adjusted under 35 U.S.C. 154(b) by 172 days.

(21) Appl. No.: 13/078,802

(22) Filed: Apr. 1, 2011

(51) Int. Cl.
*H04W 24/00* (2009.01)
(52) U.S. Cl.
USPC ........................................ 455/456.3; 455/566
(58) Field of Classification Search
USPC ...................................................... 455/456.1
See application file for complete search history.

(56) References Cited

U.S. PATENT DOCUMENTS

| | | | | |
|---|---|---|---|---|
| 6,959,192 | B1 * | 10/2005 | Cannon et al. | 455/456.3 |
| 2004/0203650 | A1 * | 10/2004 | Halpern et al. | 455/414.1 |
| 2005/0176411 | A1 * | 8/2005 | Taya et al. | 455/414.1 |
| 2005/0272448 | A1 * | 12/2005 | Tran et al. | 455/456.6 |
| 2006/0105790 | A1 * | 5/2006 | Jin et al. | 455/456.6 |
| 2010/0281314 | A1 * | 11/2010 | Pettinati | 714/57 |
| 2012/0027011 | A1 * | 2/2012 | Chu | 370/352 |
| 2012/0063586 | A1 * | 3/2012 | Lundsgaard et al. | 379/230 |

OTHER PUBLICATIONS

"PhoneFormatPlugin", http://smarty.incutio.com/?page=PhoneFormatPlugin, pp. 1-5, last modified Feb. 28, 2006, downloaded Nov. 3, 2011.
"Formatting International Phone Numbers in Apple's Address Book", http://askpeter4phoneamego.wordpress.com/2010/10/19/formatting-international-phone-numbers-in-apples-address-book/, pp. 1-2, posted Oct. 19, 2010, downloaded Nov. 7, 2011.
"Phone Amego User's Guide", http://www.sustworks.com/pa_guide/dialingOptions.html, pp. 1-2, © 2009-2011 Sustainable Softworks, downloaded Nov. 4, 2011.

* cited by examiner

*Primary Examiner* — Creighton Smith
(74) *Attorney, Agent, or Firm* — Troutman Sanders LLP; James E. Schutz; Mark Lehi Jones

(57) ABSTRACT

Method, system, and computer readable medium for detecting the correct phone number format to use based on the user current country and an original country associated with a number to be dialed. This information can be used to allow a user to keep phone numbers in his/her contact list in any common format on his/her country of origin and still allow numbers to be dialed correctly when the user is travelling anywhere in the world.

22 Claims, 20 Drawing Sheets

US 8,483,716 B1

NETWORK AND LOCATION BASED PHONE NUMBER FORMAT IDENTIFICATION

BACKGROUND

Mobile phone users usually store phone numbers in their contact lists using the most common format for their countries. In the U.S. such a format could be something like 650-555-0000 (area code and phone number) and, in Brazil, it could be something like 041 31 9999-9999 (carrier code+area code+phone number). Note that even corresponding parts of phone numbers may have different formats in different countries. For example, U.S. numbers use three digit area codes and seven digit phone numbers, while Brazilian numbers use two digit area codes and eight digit phone numbers. Also, certain countries use types of phone number information that are not used universally. For example, Brazilian dialing requires a carrier code, which is not generally required when dialing in the U.S.

This system of differing phone number formats may be acceptable for domestic travel, where only one format of phone number is used consistently. For example, a resident of Brazil who remains in Brazil can format dialed numbers in the Brazilian fashion and, similarly, store phonebook numbers according to the Brazilian standard.

However, if a U.S. resident travels to another country, such as Brazil, a problem results. Most likely, the U.S. resident's phonebook will store entries in the U.S. format. Similarly the U.S. resident will be familiar with dialing phone numbers in the U.S. format. Since the U.S. resident will be dialing from Brazil, the phone number in the U.S. format will be introduced to the Brazilian telecommunications network, and the dialing process will fail.

There are some programs and some implementations in specific mobile phones that include carrier codes for countries that use them, or otherwise provide limited location-based reformatting. However, these attempts at a solution to the location-based phone number formatting problem do not possess the capability of automatically determining an appropriate format for a location and transforming a dialed number into a predetermined format so that it can be easily and transparently dialed in that format.

BRIEF SUMMARY

A method, system, and computer-readable medium for automatically formatting a telephone number based on location information are disclosed. A dialed number is accessed using a processor on a mobile device. A source location of the dialed number is determined. One or more possible original phone number formats are determined, based on the source location. The dialed number is matched to a correct original format. Then a current location of the mobile device is determined. A destination format is determined based on the current location. The dialed number is reformatted into the destination format using the correct original format and the destination format. The result of the reformatting is sent to a dialer.

Further embodiments, features, and advantages, as well as the structure and operation of various exemplary embodiments are described in detail, below with reference to accompanying drawings.

BRIEF DESCRIPTION OF THE FIGURES

The accompanying drawings, which are incorporated herein and form a part of the specification, illustrate embodiments and, together with the description, further serve to explain the principles of the embodiments and to enable a person skilled in the pertinent art to make and use embodiments.

The drawing in which an element first appears is typically indicated by the leftmost digit or digits in the corresponding reference number. In the drawings, like reference numbers may indicate identical or functionally similar elements.

DETAILED DESCRIPTION

Technical Field

The present embodiments relate to a technology to aid in formatting phone numbers to be dialed.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Each of the constituent parts of a system embodiment may be implemented on any mobile computing device with telecommunications capability. Such a mobile computing device can include, but is not limited to, mobile devices such as mobile phones, smartphones, PDAs, portable game consoles and so on, as well as mobile computers such as laptops, notebooks, netbooks, or tablet computers with telecommunications capabilities. Further, a mobile computing device can include, but is not limited to, a portable device having a processor and memory for executing and storing instructions. Software may include one or more applications and an operating system. Hardware may include, but is not limited to, a processor, memory and graphical user interface display. The computing device may also have multiple processors and multiple shared or separate memory components.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database. The specific organization of an exemplary computing device is discussed in greater detail, below, in conjunction with FIG. 1.

It should be noted that computer-readable medium embodiments may include any physical medium which is capable of encoding instructions that may subsequently by used by a processor to implement methods described herein. Example physical media may include floppy discs, optical discs (e.g. CDs, mini-CDs, DVDs, HD-DVD, Blu-ray), hard drives, punch cards, tape drives, flash memory, memory chips. However, any other type of tangible, persistent storage that can serve in the role of providing instructions to a processor may be used to store the instructions in these embodiments.

Figure 1:
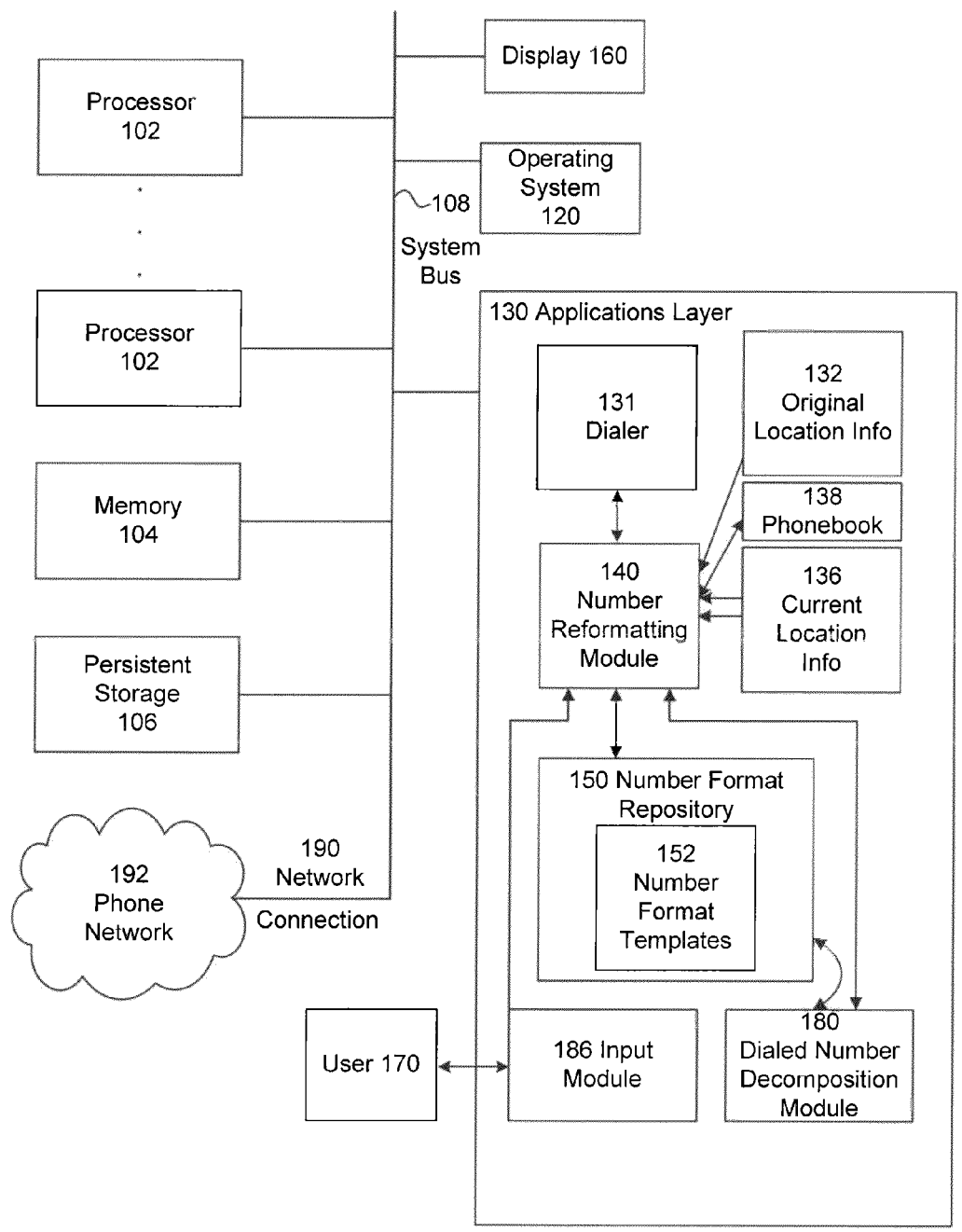
FIG. 1 is a diagram illustrating an exemplary system.

FIG. 1 is a diagram illustrating a mobile computing device 100 that accesses a phone network 192 over a network connection 190 that provides mobile computing device 100 with telecommunications capabilities. Mobile computing device 100 uses an operating system 120 as software that manages hardware resources and coordinates the interface between hardware and software.

Computer system 100 contains a combination of hardware, software, and firmware constituent parts that allow it to run in an applications layer 130 with access to phone network 192 over network connection 190. Computer system 100 may be organized around a system bus 108, but any type of infrastructure that allows the hardware infrastructure elements of mobile computing device 100 to communicate with and interact with each other may also be used.

Processing tasks in the embodiment of FIG. 1 are carried out by one or more processors 102. However, it should be noted that any type of processing technology may be used here, including multi-core processors, multiple processors, or distributed processors. Additional specialized processing resources such as graphics, multimedia, or mathematical processing capabilities may also be used to aid in certain processing tasks. These processing resources may be hardware, software, or an appropriate combination thereof.

In order to manipulate data in accordance with embodiments described herein, processors 102 access a memory 104 via system bus 108. For data that needs to be stored more permanently, processors 102 access persistent storage 106 via system bus 108. Processors 102, memory 104 and persistent storage 106 cooperate with operating system 120 to provide basic functionality for computer system 100. Operating system 120 provides support functionality for applications layer 130.

Computer system 100 may use network connection 190 to provide the mobile computing device with telecommunications access to a phone network. The phone network 192 may involve a wired connection, but may, in an exemplary embodiment, involve a cell phone network such as a 3G or 4G connection, or alternatively cell phone networks such as CDMA or GSM. Alternatively, the telecommunications access may involve Internet technologies, such as VoIP or Wi-Fi, that provide wireless telecommunications access in combination with wireless Internet access.

Mobile computing device 100 further includes several modules in its applications layer 130. These modules allow a user 170 to enter number retrieval commands into an input module 186. Input module 186 triggers number reformatting operations, which occur through use of a number reformatting module 140.

Number reformatting module 140 involves several additional modules to load and process information involved in the number reformatting process. For example, original location info 132 stores information about the original location of the mobile computing device. This information may be based on information provided by a cell network, a SIM card, or a user setting. For example, these information sources may indicate that the home country of mobile computing device 100 is Japan.

In the processing, there are three countries involved—the country the person is currently in, the country the person (and thus the person's SIM card) is originally from, and the country the dialed number is from. For example, someone currently in Brazil (first country is Brazil) with a U.S. SIM card (second country is U.S.) could be dialing a Swiss number (third country is Switzerland). All three countries may be taken into account to determine the formatting for the number. In this particular example, the U.S. SIM card would indicate that numbers are expected to be in a U.S. format by default, but if a dialed number has an indication that it is a Swiss number, it would be treated as such.

Numbers may be inputted using the input module 186 to provide a number to the number reformatting module 140. Alternatively, user 170 may use the input module 186 to retrieve a stored number from a phonebook 138.

The inputted number is analyzed by the number reformatting module with the assistance of information from a number format repository 150. Number format repository 150 contains a number of number format templates 152 that correspond with number formats for different countries. For example, templates for India would be programmed to recognize phone numbers with 2-3 digit subscriber trunk dialing (STD) codes as well as 7-8 digit landline numbers. It is to be noted that different types of templates might apply for different types of numbers, for example cell numbers, landline numbers, or emergency numbers.

A dialed number may contain a string of Arabic numerals, letters, and punctuation marks, as may a reformatted number. The dialed number and the reformatted number may each include one or more, without limitation, of a dialing prefix, a country code, a carrier code, an STD code, an area code, a phone number, an extension and other components corresponding to the source location and current location. When dialed number decomposition module 180 decomposes the number into parts, it does so by breaking the dialed number into these fields of information. The decomposition occurs by comparing the phone number to number format templates 152 and identifying parts of the phone number that correspond with the number format templates 152, as discussed above. By using a destination template from number format templates 152, these fields can be plugged into the destination template by number formatting module 140 based on the current location information 136.

The number that user 170 dials or retrieves from the phonebook is first assumed to be in the format of the user's 170 home country. For example, suppose that the user 170 is Indian. In this case, if the user dials the string of numbers 011-20000198, the number reformatting module would retrieve the original location information 132 and realize that the number should be treated as if the user was dialing an Indian number in India. Number reformatting module 140 would then access number format repository 150 and retrieve the Indian format template from the set of number format templates 152.

Number format templates 152 would then indicate that an Indian number would consist of a leading 0, 2-3 digits of STD code, and 7-8 digits of phone number. For example, the template might use tags or markup in an exemplary embodiment to define a template, such as:

{India}:
<Leading_Zero: 1>
<STD: 2 . . . 3;
11: New Delhi, Delhi;
22: Mumbai, Maharashtra;
512: Kanpur, Uttar Pradhesh>
<Phone_Number: 7 . . . 8>

Tags may include appropriate labels for the various parts of a phone number, such as Country_Code or Extension.

The number format repository 150 could also store additional information to help differentiate between various incarnations of the numbers for a given country's formatting. For example, the number format repository might identify 11 (New Delhi, Delhi) and 22 (Mumbai, Maharashtra) as valid two-digit STDs, whereas 512 (Kanpur, Uttar Pradhesh) would be a three-digit STD.

Number reformatting module 140 can then work in tandem with a dialed number decomposition module 180. It can use the information provided by number format repository and the number format templates, as well as original location information 132 to break a dialed number down into components.

For, example, dialed number decomposition module receives from the original location info 132 that user 170 is Indian and they wish to dial a number from their phonebook, "011-20000198". Numbers in the phonebook are assumed by default to be from the user's 170 home country, in this case India, but user 170 can certainly specify in phonebook 138 that a given number is in another format, for example Brazilian or South African, and it will be treated as such. Alternatively, the number may be a universal international format, and may subsequently be transformed into a specific country's format to be dialed.

The template from number format templates 152 tells the dialed number decomposition module to break this number into a prefix of 0, and then to split the remaining digits into STD and number. In this case, the STD can be recognized as 11 for New Delhi, Delhi. The actual phone number is, then the eight-digit number 20000198.

Suppose, then, that the Indian user 170 is physically located in the U.S. when placing the call, or otherwise is in a circumstance where the mobile computing device needs to use U.S. calling conventions to dial a number. Number reformatting module 140 can establish whether or not this is the case, for example, by using a cell phone positioning service or GPS. For example, if the Indian user 170 was placing the call in Europe, using a Europe based cell network, in order to reach the number in New Delhi, it would be necessary to reformat the phone number into the European version of the same number before it could be dialed.

Dialed number decomposition module 180, by this point, will have already established what the parts of the dialed number are, based on the type of number that the number is stored as. The number reformatting module uses current location information 136 to establish, using number format repository 150 and number format templates 152, what an appropriate destination format template would be for the given phone number.

Thus, to dial the Indian number 011-23456789 from Europe, number formatting module 140 would produce is 00 (international access code) 91 (Indian prefix) 11 (New Delhi STD) 23456789 (phone number), using fields for the international access code, Indian prefix, New Delhi STD, and phone number as stored in the number format templates 152.

Thus, number formatting module 140 would transform the number 011-23456789 stored as an Indian number (either by default for an Indian user 170, or alternatively as a specifically Indian number in another user's phonebook 138) into 00 91 11 23456789 where European dialing conventions apply, such as if the user 170 had current location info 136 such as Spain or Italy.

Once the number has been transformed by number reformatting module 140, the number is sent to a dialer 131 in the mobile computing device 100 to be dialed by the mobile computing device in conjunction with network 192 to establish a connection with the desired number.

FIG. 1 also includes a display 160, that provides a visual representation of the output of mobile computing device 100 to the user. It is to be noted that the display may be a touchscreen integrated with input module 186, but a touchscreen is not required as input module 186 may also provide input through buttons, for example.

Figure 2:
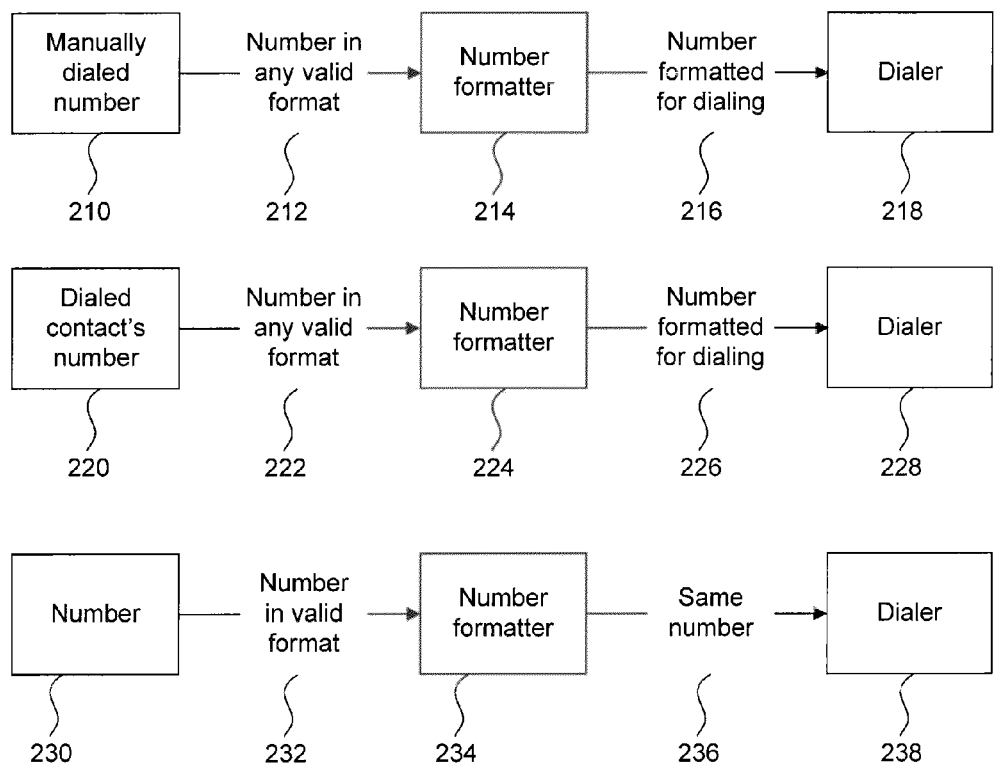
FIG. 2 is a flowchart of an exemplary method.

FIG. 2 is a flowchart of an exemplary method showing how phone numbers are transformed, in three exemplary cases 210, 220 and 230.

In case 210, mobile computing device 100 receives a manually dialed number. For example, user 170 may enter a number using an input module 186. In stage 212 this number is recognized to be in any valid format that corresponds with the home nationality of user 170 home nationality, which is the default nationality. This recognition requires the cooperation of, for example, original location info 132, number format templates 152, and dialed number decomposition module 180. In stage 214, the number formatting module operates on the dialed number. This formatting produces a number formatted for dialing 216 which is passed to the dialer in stage 218. This stage may involve the cooperation of, for example, number reformatting module 140, current location info 136, number format repository 150, number format templates 152, and dialed number decomposition module 180.

In case 220, mobile computing device 100 receives a dialed contact's number. For example, user 170 may retrieve a number from phonebook 138 using an input module 186. In stage 222 this number is recognized to be in a specific format stored with the number, or the original location of the user by default. This recognition requires the cooperation of, for example, phonebook 138, original location info 132, number format templates 152, and dialed number decomposition module 180. In stage 224, the number formatting module operates on the dialed number. This formatting produces a number formatted for dialing 226 which is passed to the dialer in stage 228. This stage may involve the cooperation of for example, number reformatting module 140, current location info 136, number format repository 150, number format templates 152, and dialed number decomposition module 180.

In case 230, mobile computing device 100 receives a number which is already in a correct format for the location. For example, suppose that a German user 170 enters a U.S. number in a valid U.S. format while they are calling from Colorado, using an input module 186. In stage 232 this number is recognized to be already in a valid format for the user's 170 current location. This recognition requires the cooperation of current location info 136, number format templates 152, and dialed number decomposition module 180. In stage 234, the number formatting module operates on the dialed number. This formatting produces the same number, which is already formatted for dialing in stage 236 which is passed to the dialer in stage 238. This stage may involve the cooperation of, for example, number reformatting module 140, current location info 136, number format repository 150, number format templates 152, and dialed number decomposition module 180.

Figure 3:
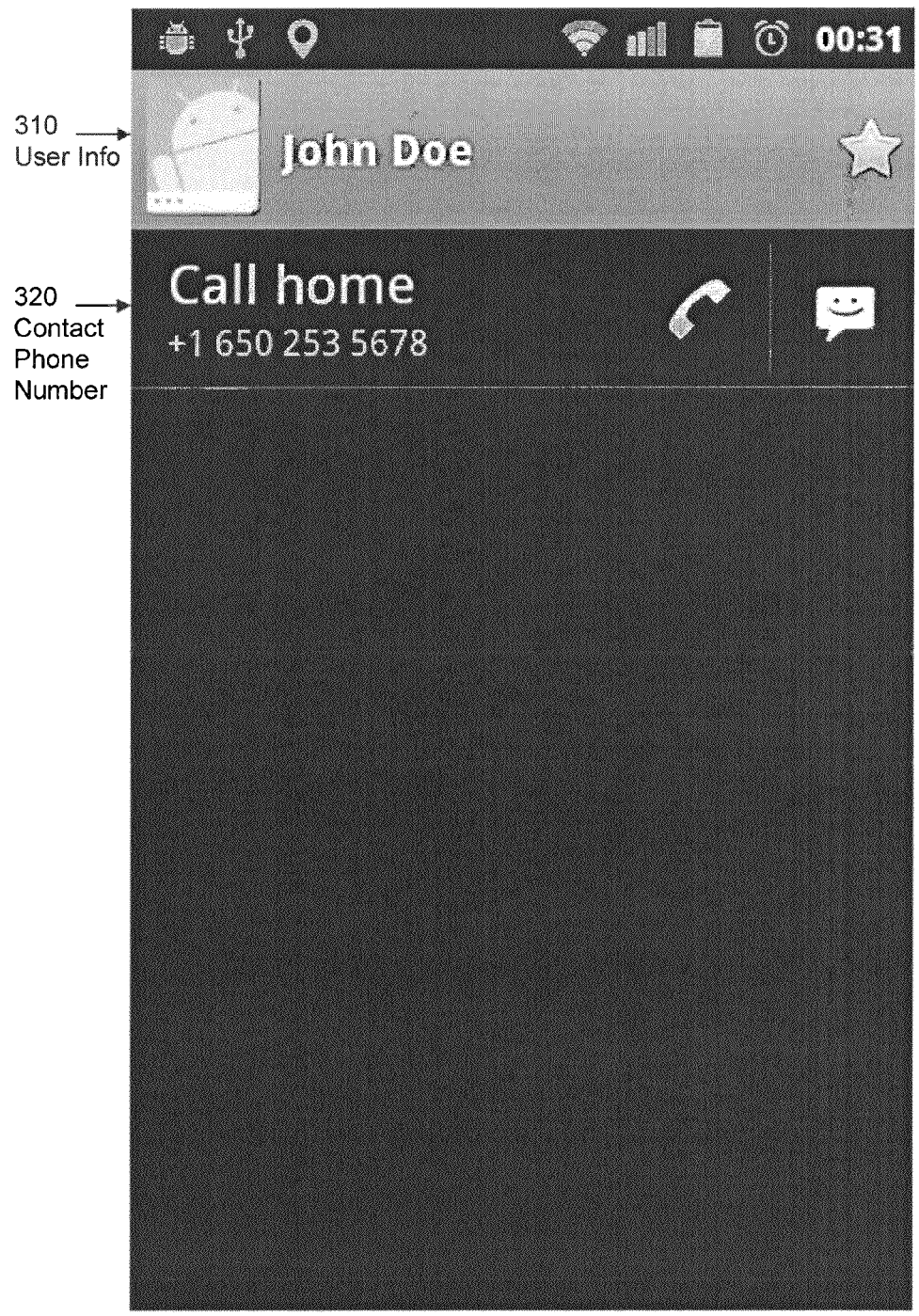
FIG. 3 is a screenshot of a mobile device listing a user's home number.

FIG. 3 is a screenshot of a mobile device listing a user's home number. It is to be noted that this and subsequent screenshots represent captured images from the display 160 of an exemplary embodiment, representing still shots of the operation of an exemplary embodiment.

User Info 310 contains a link to a page containing information about a user. For example, user info 310 here refers to "John Doe". For example, John Doe may have a phonebook 138 associated with his account, and he also may have stored associated preferences. For example, suppose that Mr. Doe is characterized as an American citizen. This corresponds with his contact phone number 320, identified as "Call home" with the corresponding phone number in domestic format for the U.S., "+1 650 253 5678".

Regardless of whether Mr. Doe is in the U.S. or abroad, number reformatting module 140 will dial the appropriate number when Mr. Doe or another user 170 attempts to reach Mr. Doe's home number.

Figure 4:
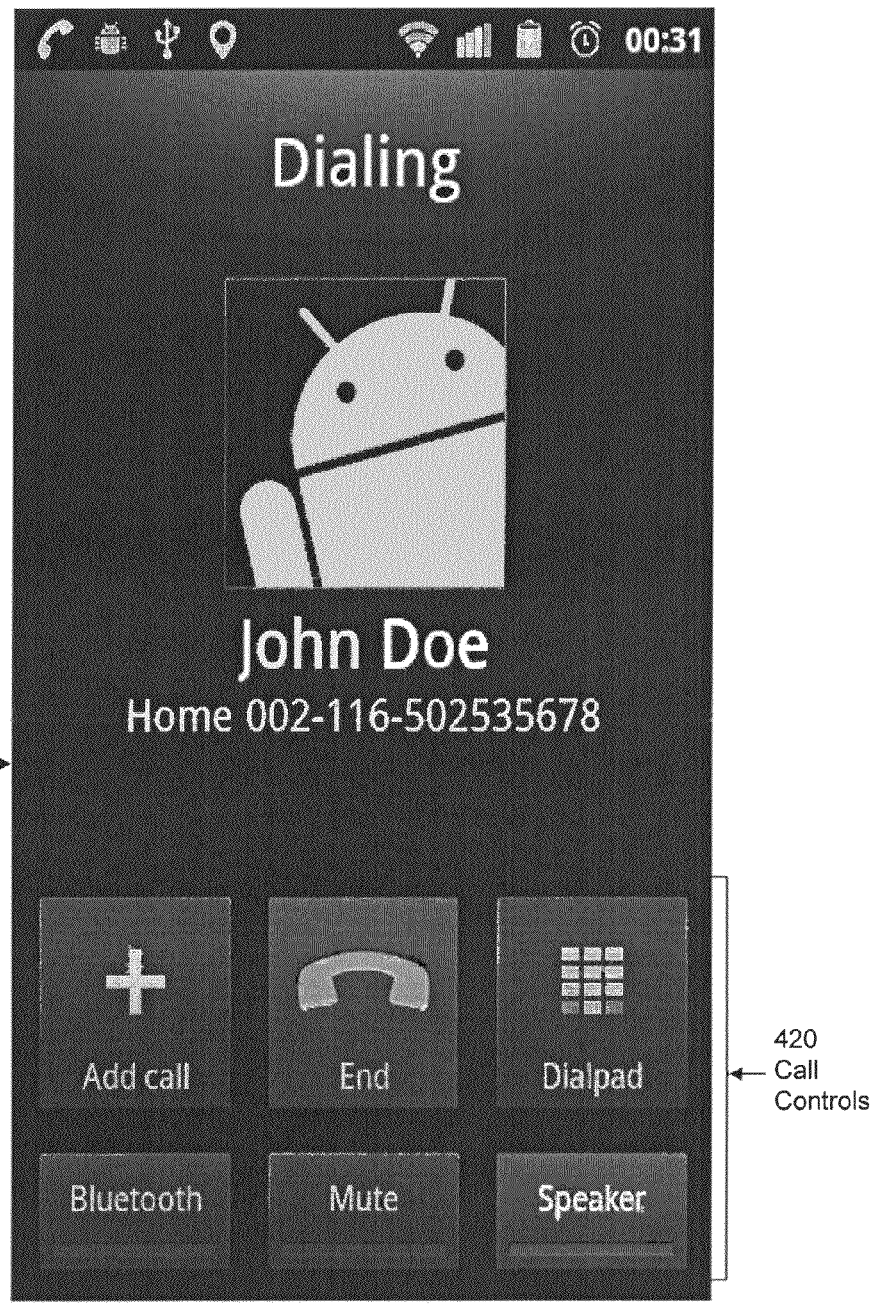
FIG. 4 is a screenshot of a mobile device calling a user's reformatted home number.

FIG. 4 is a screenshot of a mobile device calling a user's reformatted home number. For example, reformatted phone number 410 reflects how the phone number has been reformatted to provide an appropriate phone number to reach Mr. Doe's phone number from Brazil. Also shown on display 160 in FIG. 4 is a set of call controls that allow a user to control the call, with features such as "Mute" and "Speaker".

Figure 5:
FIG. 5 is a screenshot of a mobile device listing a number dialed by a user.

FIG. 5 is a screenshot of a mobile device listing a number dialed by a user. A dialer 520 allows user 170 to enter a number with a set of call controls 530 allowing the user to control placing the call, backspacing, and so on. In FIG. 5, "553191234567" represents a dialed phone number 510 that is an international call to Brazil.

Figure 6:
FIG. 6 is a screenshot of a mobile device calling a user's reformatted dialed number.

FIG. 6 is a screenshot of a mobile device calling a user's reformatted dialed number. Once again, call controls 620 allow a user to control a call, whereas here the original long distance call to Brazil has been transformed to a domestic call in Brazil, a reformatted dialed phone number "021-319-1234567" that reflects a leading 0, 21 as the carrier code (Embratel), 31 as the area code (Belo Horizonte), and 91234567 as the number.

Figure 7:
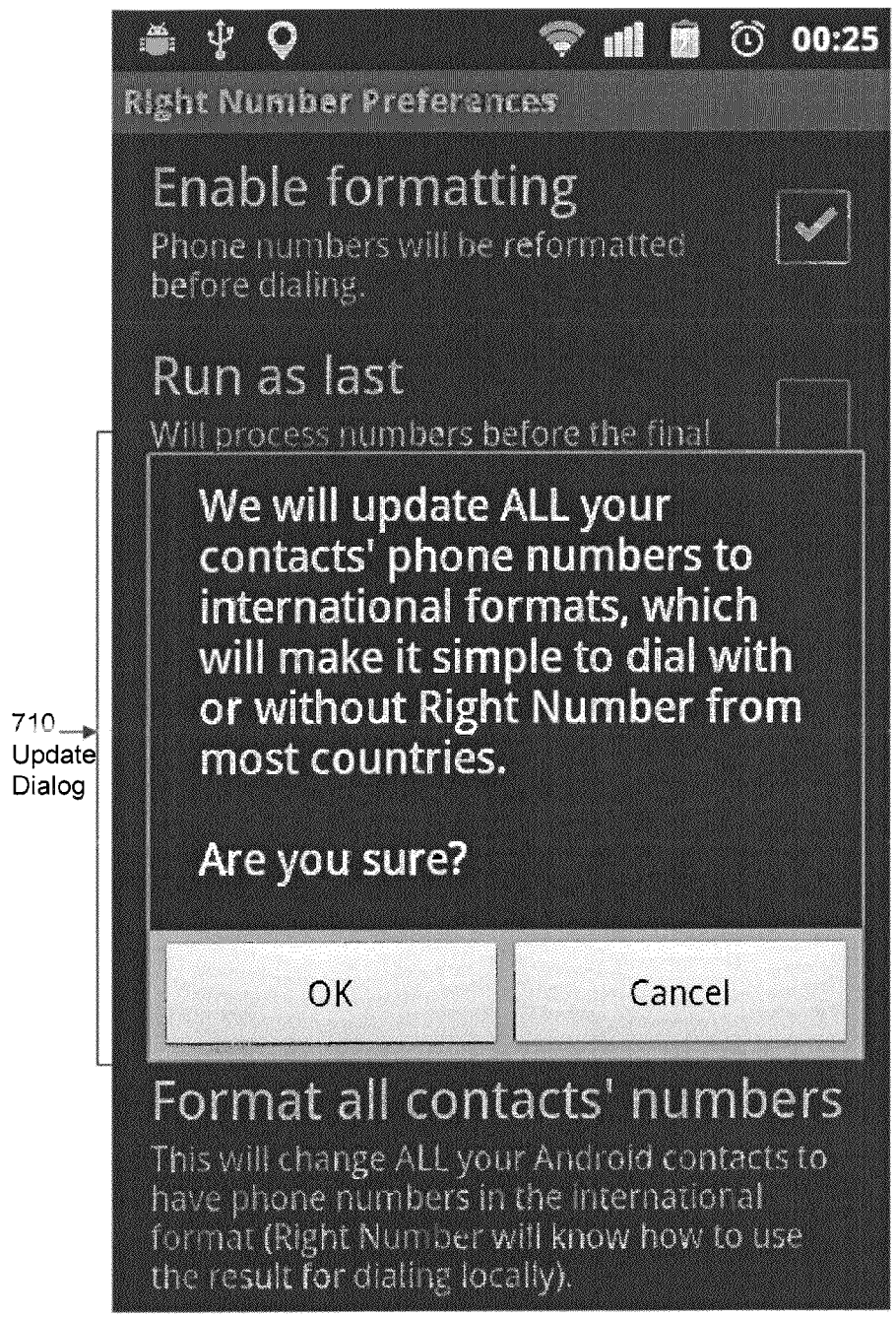
FIG. 7 is a screenshot of a mobile device prompting a user to update all numbers in his/her contacts to international format.

FIG. 7 is a screenshot of a mobile device prompting a user to update all numbers in his/her contacts to international format. This feature takes all of the numbers in a user's 170 phone book 138 and transforms them into a universal international format that will expedite their further transformation into other formats for dialing. To do the transformation, their existing format is matched to a number format template 152 in number format repository 150 by a dialed number decomposition module 180 based on information in phonebook 138. After the transformation, the information from all phone numbers in phonebook 138 which began in a correct format can easily be changed into any needed destination format. However, phone numbers which were not originally in a correct format will be left in their original state.

Figure 8:
FIG. 8 is a screenshot of a mobile device listing a number dialed by a user in an incorrect format.

FIG. 8 is a screenshot of a mobile device listing a number dialed by a user in an incorrect format. For example, 1-222-222-22222 is an invalid phone number 810. This entry does not readily correspond with any correct national format. If the user attempts to dial this number, it will not be reformatted under the assumption that the user wishes to dial the number as is.

Figure 9:
FIG. 9 is a screenshot of a mobile device dialing a number as dialed by a user in an incorrect format.

FIG. 9 is a screenshot of a mobile device dialing a number as dialed by a user in an incorrect format. In FIG. 9, the call controls 920 are hidden behind a user alert 930. User alert 930 informs user 170 that the phone number is being used as-is, because reformatting is not possible. This as-is dialed phone number 910 is dialed on the display 160 using the dialer 131, except that no reformatting has been performed on the as-is dialed phone number 910.

Figure 10:
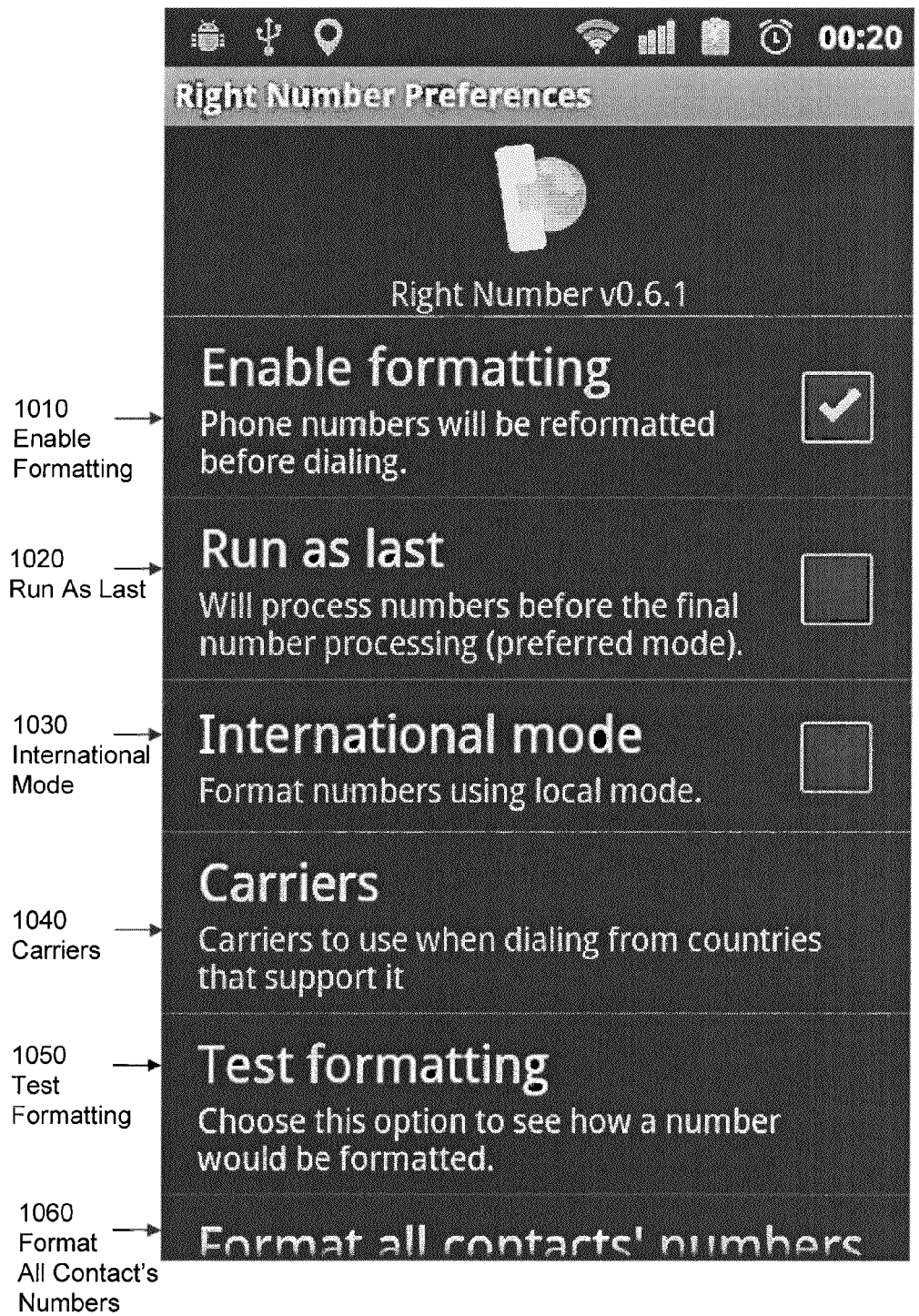
FIG. 10 is a screenshot of a mobile device listing user options.

FIG. 10 is a screenshot of a mobile device listing user options. It represents preferences for an exemplary embodiment. Enable formatting 1010 uses a checkbox or similar control, in an embodiment to control whether or not formatting is enabled. If the box is checked, mobile computing device 100 will reformat numbers using number reformatting module 140 before dialing, otherwise it will preserve numbers in their original format. Note that numbers that cannot be reformatted will not be reformatted, in any event.

The run as last checkbox 1020 processes numbers before dialing them, using the reformatted number to dial.

The international mode checkbox 1030 formats numbers in a given original country's format into the local calling area's format before dialing.

The carriers option 1040 gives access to carriers in countries that support this feature.

The test formatting option 1050 allows user 170 to test out reformatting to see what result it will produce.

The format all contacts' numbers option 1060 reformats all of the contacts into an international format. The operation of this option is shown in FIG. 7.

Figure 11:
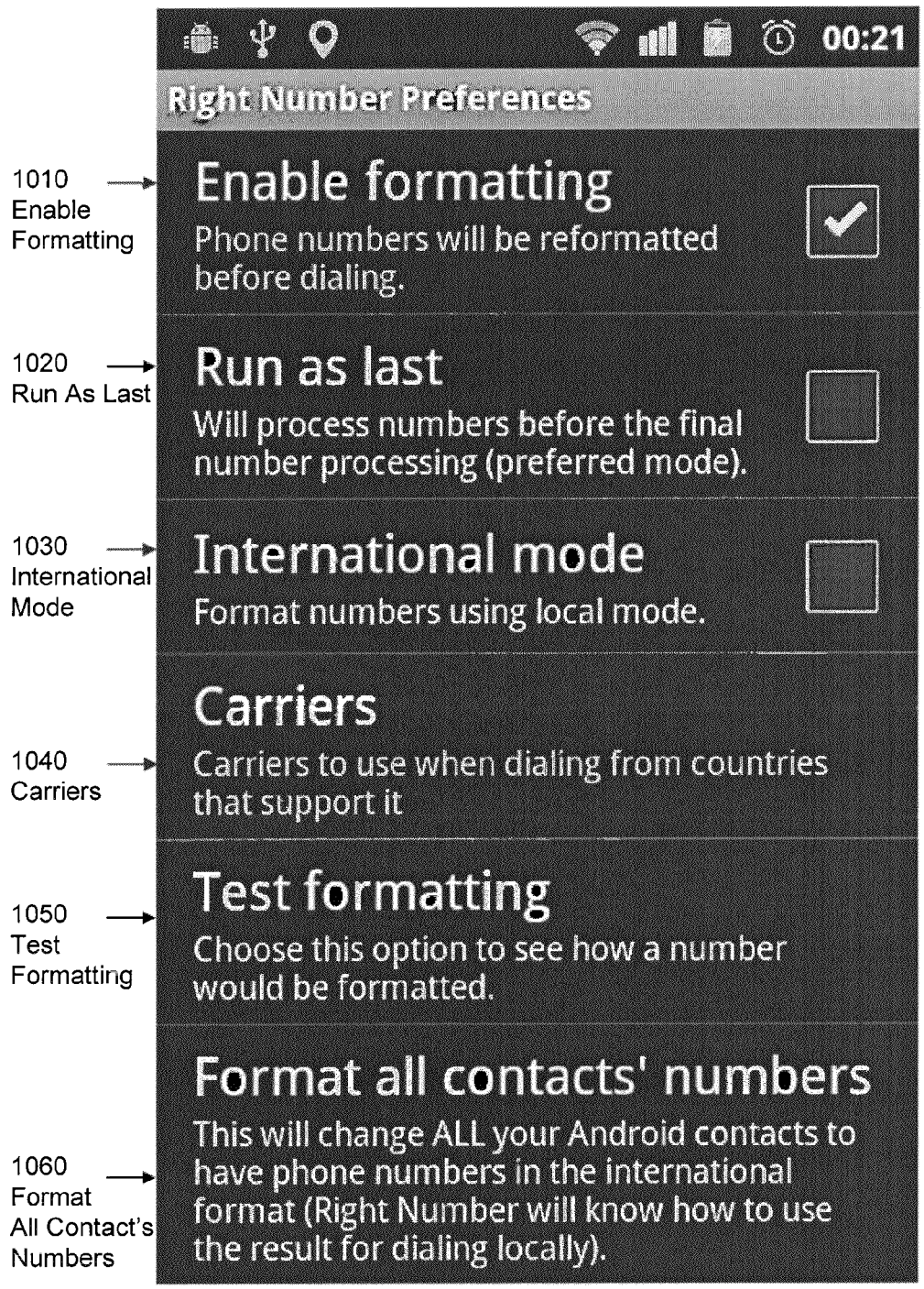
FIG. 11 is a further screenshot of a mobile device listing user options.

FIG. 11 is a further screenshot of a mobile device listing user options. It shows the result of scrolling down slightly on the display of FIG. 10, and lists the same options, as detailed in FIG. 10.

Figure 12:
FIG. 12 is a screenshot of carriers, listed by country.

FIG. 12 is a screenshot of carriers, listed by country. Carriers 1210 provides a list of country options 1220, which lead to specific countries such as "Bolivia", "Brazil", "Columbia", etc., presented as country options 1220 to select carriers from.

Figure 13:
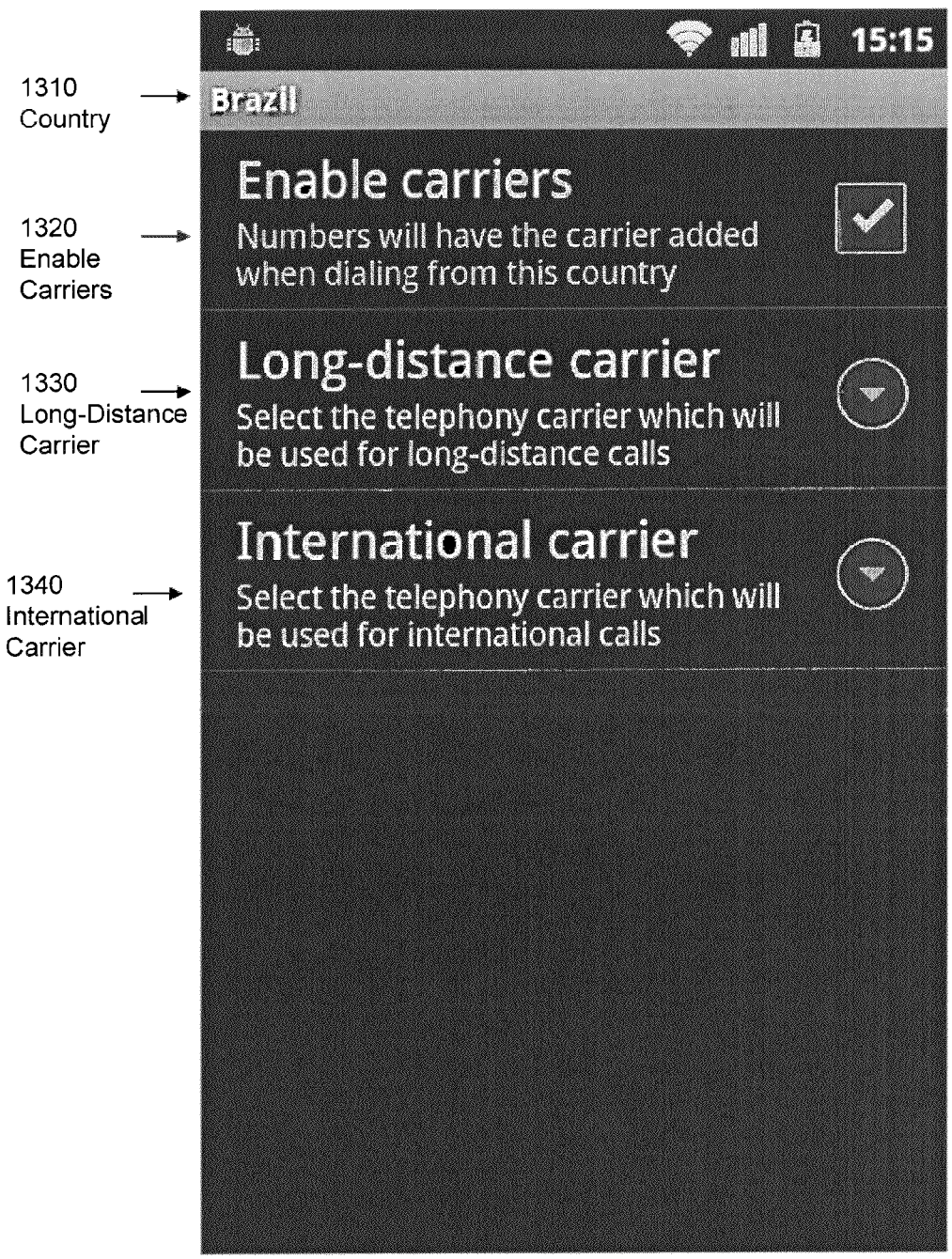
FIG. 13 is a screenshot of options provided to a user to select long-distance and international carriers.

FIG. 13 is a screenshot of options provided to a user to select long-distance and international carriers. Item 1310 lists the country, which in the example of FIG. 13 is Brazil. Checkbox 1320 allows a user to toggle whether use of the carriers feature (i.e., whether and how long-distance and international carrier codes are integrated into dialed numbers) is activated. When the carriers feature is activated via checkbox 1320, drop-down menus for long-distance carrier 1330 and international carrier 1340 appear.

Figure 14:
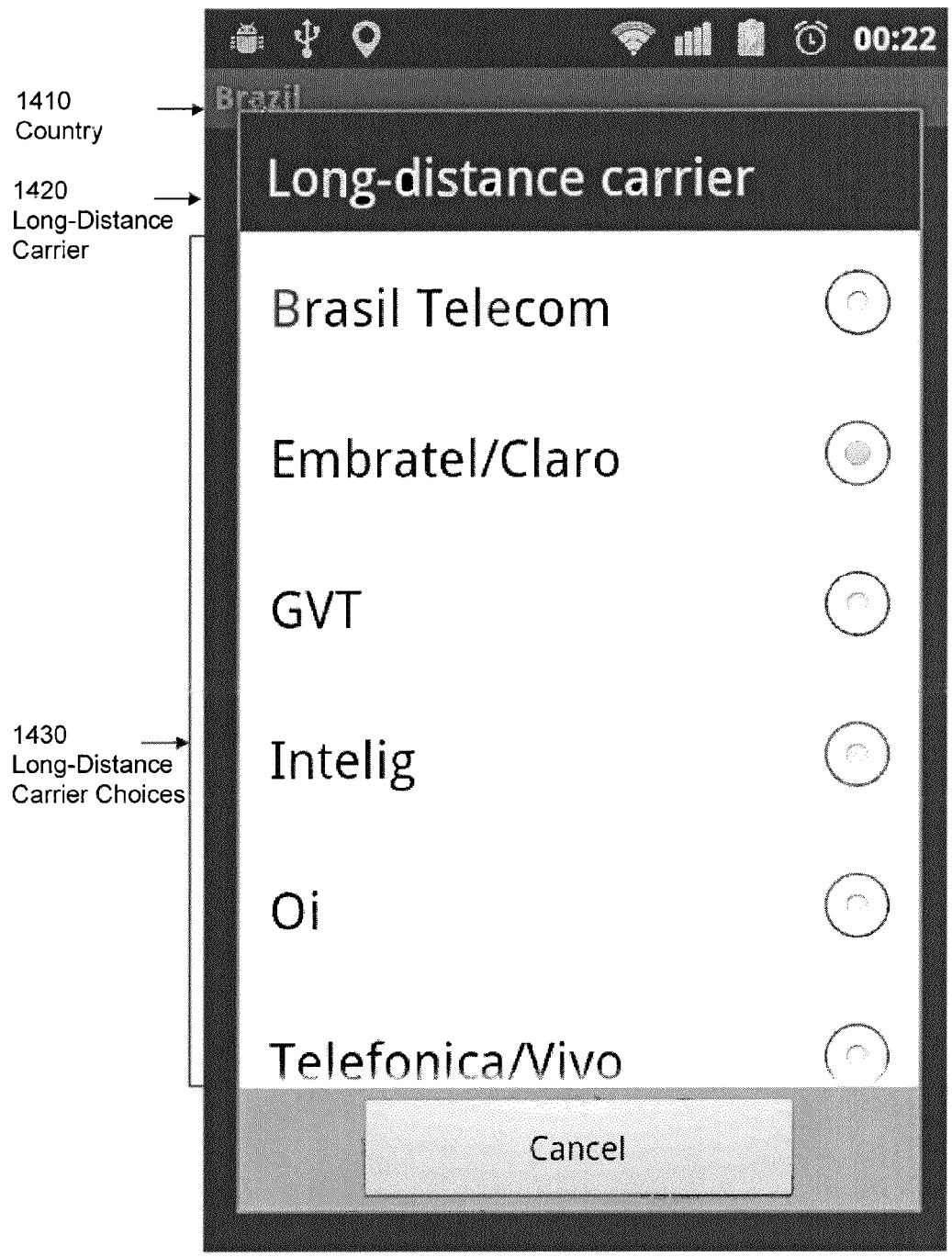
FIG. 14 is a screenshot of long-distance carriers, listed for Brazil.

FIG. 14 is a screenshot of long-distance carriers, listed for Brazil. For example, Brazil is listed as the country 1410, and long-distance carrier 1420 is at the head of a series of radio buttons that provide options for a long-distance carrier. These options include a list of various long-distance carrier choices, including "Brasil Telecom", "Embratel/Claro", "GVT" and so on. When user 170 selects a carrier, the number reformatting module automatically includes it in a phone number that is reformatted before being sent to the dialer 131.

Figure 15:
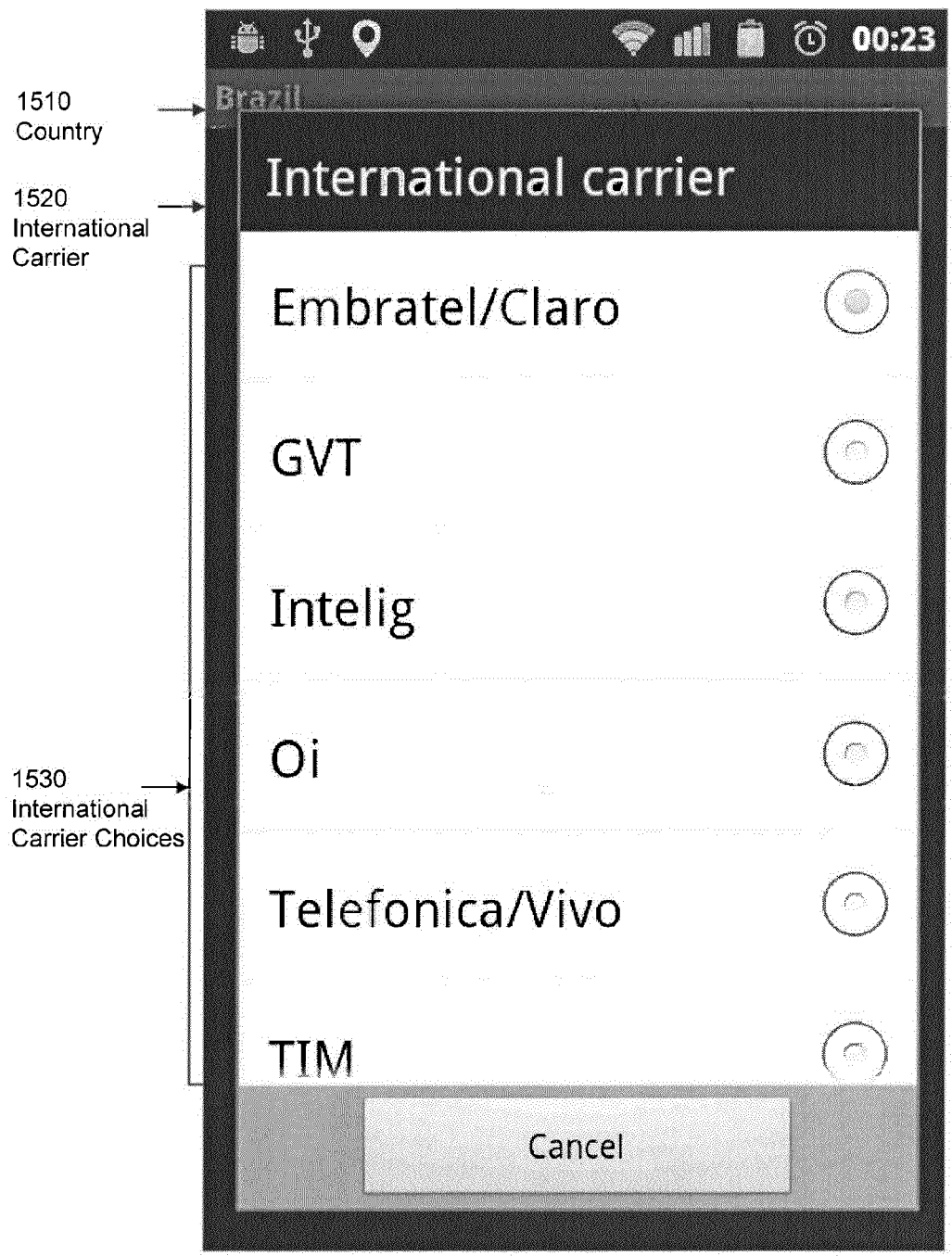
FIG. 15 is a screenshot of international carriers, listed for Brazil.

FIG. 15 is a screenshot of international carriers, listed for Brazil. For example, Brazil is listed as the country 1510, and international carrier 1520 is at the head of a series of radio buttons that provide options for an international carrier. These options include a list of various international carrier choices 1530, including "Embratel/Claro", "GVT", "Intelig" and so on. When user 170 selects an international carrier, the number reformatting module automatically includes it in a phone number that is reformatted before being sent to the dialer 131.

Figure 16:
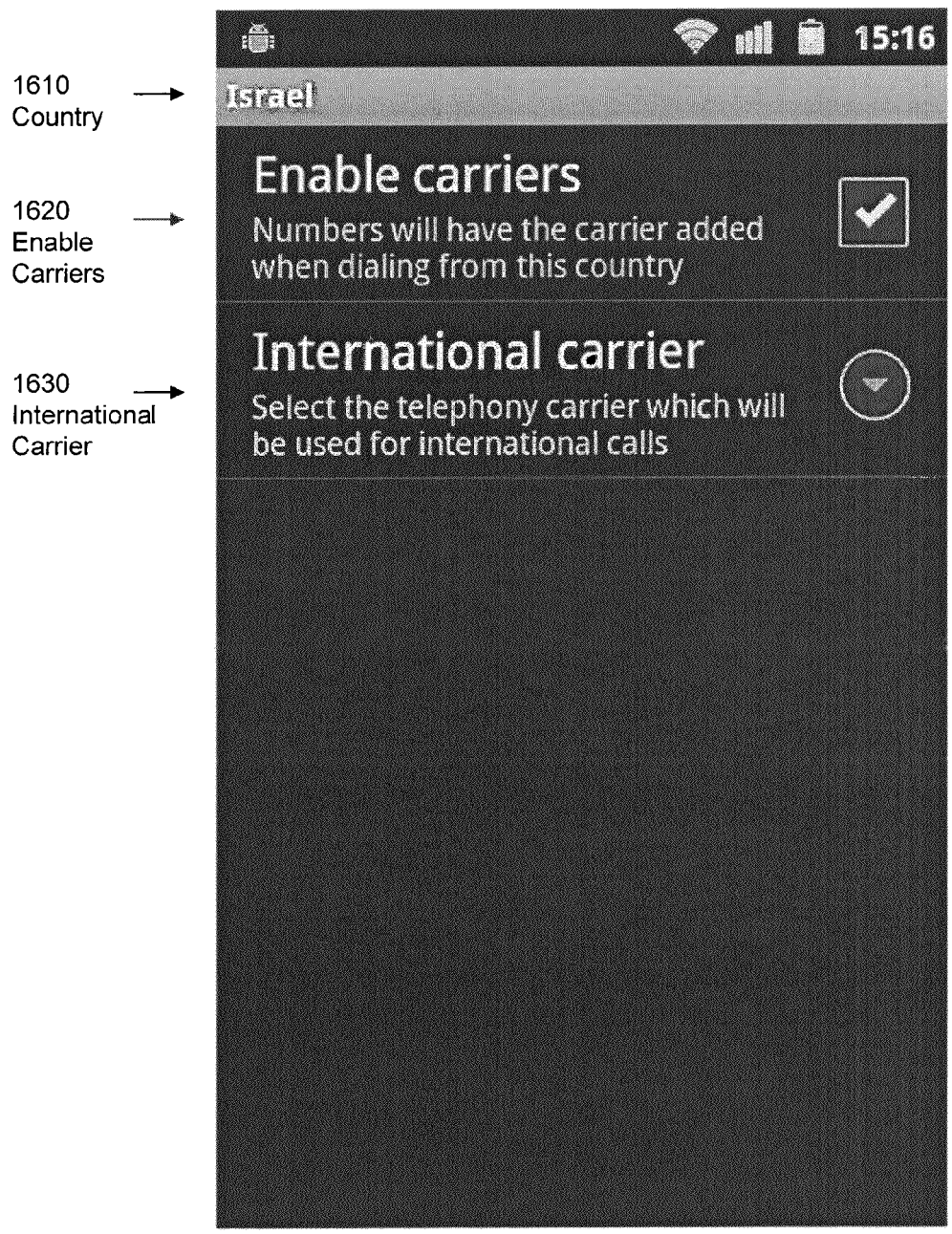
FIG. 16 is a screenshot of carrier options that a user can set for Israel.

FIG. 16 is a screenshot of carrier options that a user can set for Israel. For example, Israel may be listed as the country 1610. From this screen, the user can use a checkbox to enable carriers 1620 to have numbers for a carrier added when dialing from this country, based on current location information 136. The international carrier dropdown of FIG. 17, similar to that of FIG. 15 may be accessed using the international carrier dropdown 1630.

Figure 17:
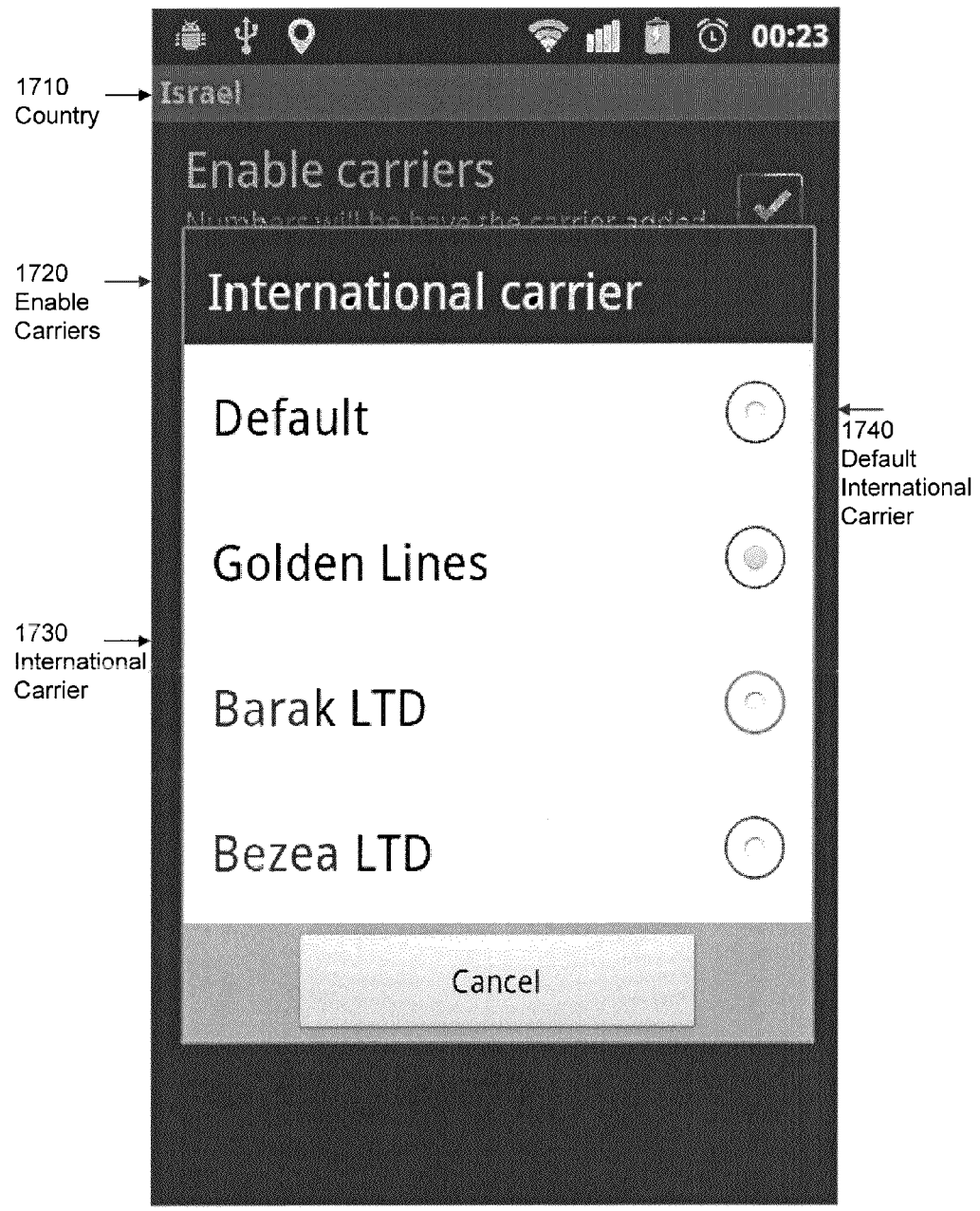
FIG. 17 is a screenshot of various international carriers that a user can choose.

FIG. 17 is a screenshot of various international carriers that a user can choose. As in FIG. 16, the country 1710 is Israel. In this example of international carriers 1720 dropdown enable menu, the user can choose an international carrier 1730. The international carrier is differentiated in that user 170 can choose a default international carrier, as opposed to specific Israeli carriers such as "Golden Lines", "Barak LTD", or "Bezea LTD", for example.

Figure 18:
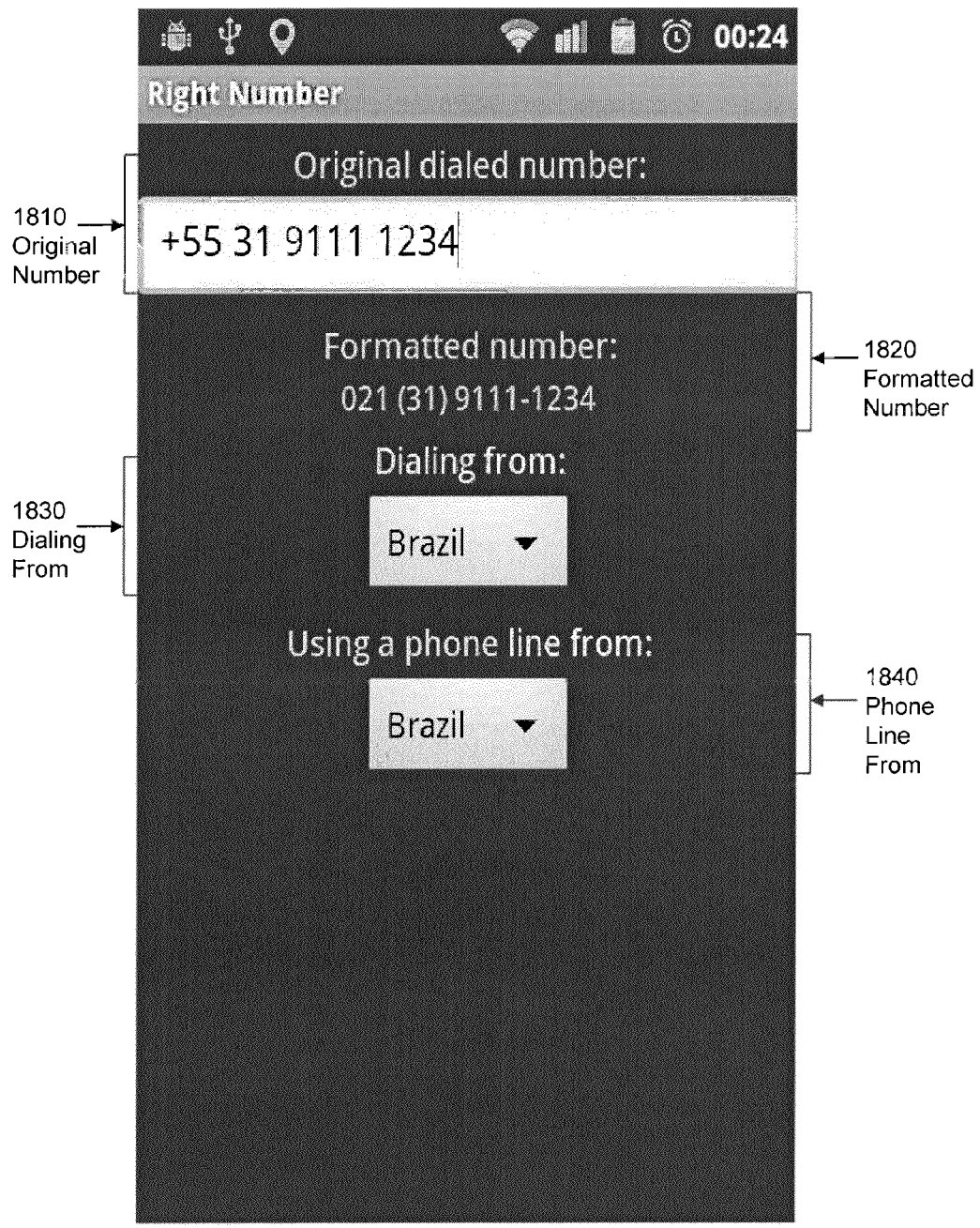
FIG. 18 is a screenshot of a Brazilian phone number that is being transformed into Brazilian format.

FIG. 18 is a screenshot of a Brazilian phone number that is being transformed into Brazilian format. The original number 1810 is +55 31 9111 1234 which is an international number for Brazil. This original number 1810 is transformed into a formatted number 1820 for a number that is dialed from 1830 Brazil, using a phone line from Brazil 1840. These parameters for the number cause number reformatting module to produce the formatted number 021 (31) 9111-1234, which reflects the appropriate carrier and area codes for the number when dialed by dialer 131 under these conditions.

Figure 19:
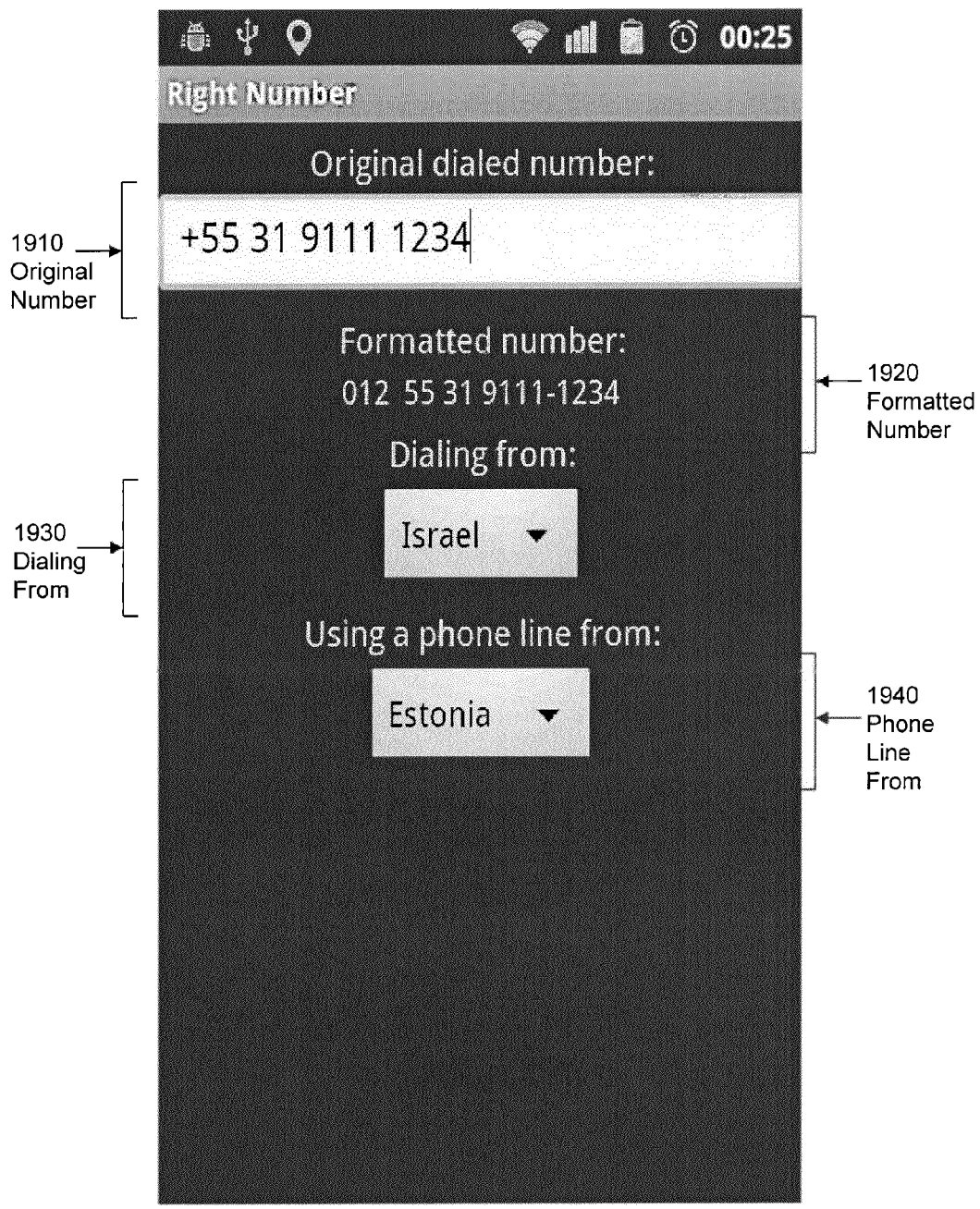
FIG. 19 is a screenshot of a test feature that allows a user to check how a number would be formatted without having to actually dial the number.

FIG. 19 is a screenshot of a test feature that allows a user to check how a number would be formatted without having to actually dial the number. FIG. 19 shows a test where a user that lives in Estonia (or for some other reason has a phone from Estonia) (see phone line from 1940) is traveling to Israel (see dialing from 1930) and dials a Brazilian number using the international format (+55 31 9111 1234) (see original number 1910) that gets reformatted to the correct dialing convention for Israel when calling abroad (012 55 31 9111 1234) (see formatted number 1920). In this particular case, dialing from 1930 is irrelevant as original number 1910 is in the international format (which is country independent). In other words, what FIG. 19 shows is that embodiments can handle the international format.

More generally, phone line from 1940 is used to figure out how to parse original number 1910, where it is assumed that original number 1910 will be dialed either in a valid format in the country selected here or will be dialed using the international format.

Dialing from 1930 is used to know how to format the parsed number in a format that will work for the current country currently selected here.

It should be emphasized that FIG. 19 provides a screenshot of a testing feature. Other embodiments may provide for determining the original country and current country automatically when a number is dialed.

Figure 20:
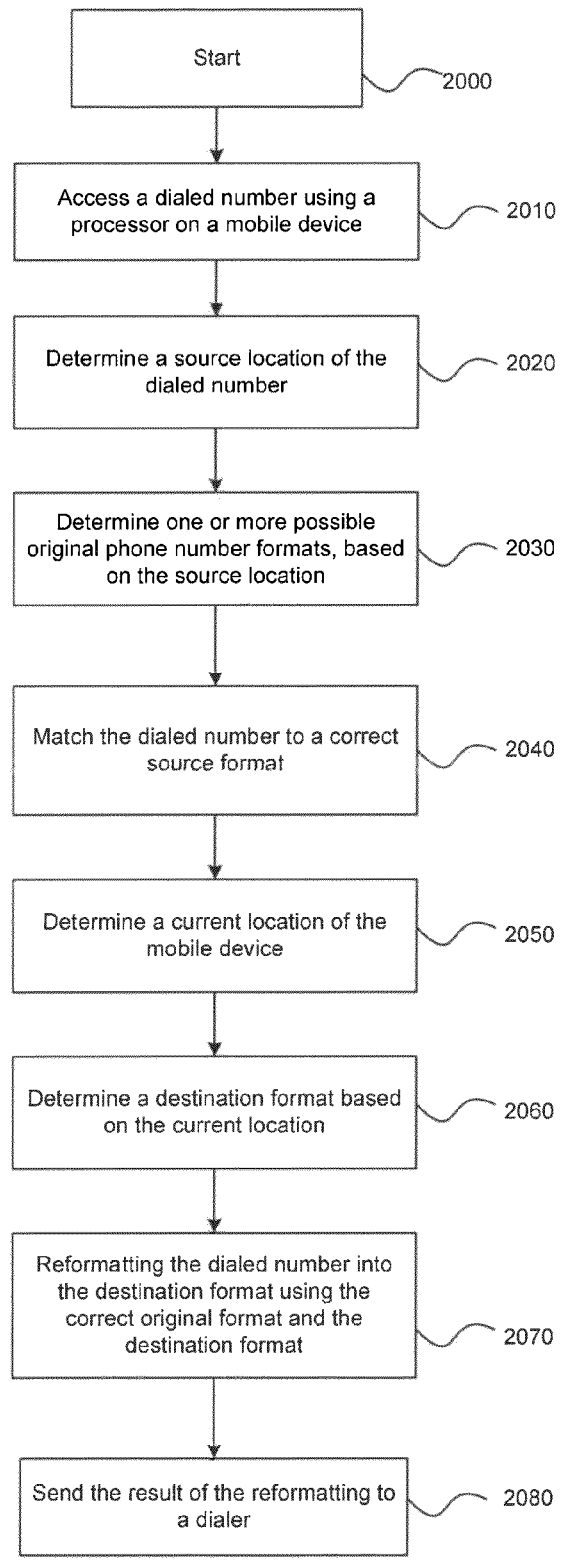
FIG. 20 is another flowchart of an exemplary method.

FIG. 20 is another flowchart of an exemplary method. The computer-based method begins at stage 2000. In stage 2010, a dialed number is accessed using a processor on a mobile device. For example, processor 102 on mobile computing device 100 may access a phone number from phonebook 138 or input module 186. In stage 2020, a source location of the dialed number is determined. For example, the determination step may involve original location info 132 or the phonebook 138. In stage 2030, one or more possible original phone number formats are determined, based on the source location. For example, the formats may be determined using number format templates 152 in number format repository 150. In stage 2040, the dialed number may be matched to a correct source format. This matching may occur by using dialed number decomposition module 180 in conjunction with number reformatting module 140. In stage 2050, a current location of the mobile device is determined. For example, the current location may be determined using current location info 136. In stage 2060, a destination format may be determined based on the current location. The destination format may be determined by using number formatting module 140 in conjunction with current location info 136 and number format repository 150 and number format templates 152. In stage 2070, the dialed number may be reformatted into the destination format using the correct original format and the destination format. For example, stage 2070 may involve number reformatting module 140 operating in conjunction with one or more of original location info 132, current location info 136, phonebook 138, number format repository 150, number format templates 152, and dialed number decomposition module 180. Finally, the method ends with stage 2080, in which the results of the reformatting are sent to a dialer. This stage may occur, for example, between phone number reformatting module 140 and dialer 131.

Advantages

Exemplary embodiments present many advantages over current phone number dialing systems. Current phone number dialing systems may force users to convert between formats on their own. This requires memorizing a great amount of detail about the conventions and standards for different formats of phone numbers in different countries, and can be needlessly difficult.

Exemplary embodiments present the advantages that the reformatting is automatic and effortless. Rather than relying on the user to transform numbers from format to format, which can be error-prone, the embodiments easily and efficiently take a number in an original format and transform it into a destination format. By using a processor and a knowledge base of information about phone number formats, as well as information about the phone number's original location and current location, the embodiments allow users from any arbitrary country to dial numbers, either manually or from a phone book, wherever they are. Reformatting can easily be toggled on or off, and numbers that are already properly formatted need not be modified.

Thus, exemplary embodiments represent an effective way to simplify and facilitate telecommunications by users of mobile computing devices who travel internationally, where number dialing formats differ as the users place calls from assorted countries.

The Summary and Abstract sections may set forth one or more but not all exemplary embodiments as contemplated by the inventors, and thus, are not intended to limit the embodiments and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A method for automatically formatting a telephone number based on location information, comprising:
   in a mobile device:
      transforming numbers in a phone book of a user from their original format into a universal international dialing format, wherein the original format is associated with an original location of the mobile device, and the universal international dialing format comprises "+", a country code, an area code, and a phone number;
      accessing a dialed number from the phone book using a processor on the mobile device;
      determining a current location of the mobile device;
      determining a destination format based on the current location;
      reformatting the dialed number from the universal international dialing format into the determined destination format; and
      sending the result of the reformatting to a dialer.

2. The method of claim 1, wherein the transforming of the numbers in the phone book comprises:
   for a corresponding number in the phone book:
      detecting the original format associated with the corresponding number based on one of the original location of the mobile device or a country designated by the user and associated with the corresponding number in the phone book;
      decomposing the corresponding number using one of a plurality of decomposition templates, based on the detected original format, to generate at least a country code, an area code, and a phone number associated with the corresponding number; and
      generating a universal international dialing number for the corresponding number, based on the generated country code, the area code, and the phone number associated with the corresponding number.

3. The method of claim 1, further comprising dialing the number returned to the dialer using a telecommunications network associated with the current location.

4. The method of claim 1, further comprising breaking the dialed number into a set of parts, comprising one or more of: a dialing prefix, a country code, a carrier code, an STD code, an area code, a phone number, and an extension.

5. The method of claim 4, further comprising using a template based on the source location to recognize how to break the dialed number into a set of parts.

6. The method of claim 4, further comprising using a template based on the current location to recognize how to reformat the parts of the dialed number into the reformatted number.

7. The method of claim 1, further comprising using one or more of the current location, a number format repository, and user input to provide one or more of a dialing prefix, a country code, a carrier code, an STD code, an area code, or an extension in order to reformat the dialed number in accordance with the current location.

8. A system for automatically formatting a telephone number based on location information, comprising:
   in a mobile device comprising a processor, a number reformatting module and a dialer, wherein the number reformatting module is operable to:
      transform numbers in a phone book of a user from their original format into a universal format, wherein the original format is associated with an original location of the mobile device, and the universal international dialing format comprises "+", a country code, an area code, and a phone number;
      receive a dialed number from the phone book and a current location of the mobile device; and
      use the processor to reformat the dialed number from the universal international dialing format into a reformatted number so that it reflects a correct dialing format for the current location; and
   the dialer is operable to receive the result of the reformatting.

9. The system of claim 8, wherein the result of the reformatting is the dialed number when reformatting is not possible.

10. The system of claim 8, further comprising that the dialer dials the result of the reformatting using a telecommunications network associated with the current location.

11. The system of claim 8, further comprising a dialed number decomposition module that breaks the dialed number into a set of parts, comprising one or more of: a dialing prefix, a country code, a carrier code, an STD code, an area code, a phone number, and an extension.

12. The system of claim 11, further comprising using a template based on the source location to recognize how to break the dialed number into a set of parts.

13. The system of claim 11, further comprising using a template based on the current location to recognize how to reformat the parts of the dialed number into the reformatted number.

14. The system of claim 8, farther comprising using one or more of the current location, a number format repository, and user input to provide one or more of a dialing prefix, a country code, a carrier code, an STD code, an area code or an extension in order to reformat the dialed number in accordance with the current location.

15. A computer-readable storage device having computer-executable instructions stored thereon that, when executed by a processor, cause the processor to automatically format a telephone number based on location information, by executing steps comprising:
   in a mobile device:
      transforming numbers in a phone book of a user from their original format into a universal international dialing format, wherein the original format is associated with an original location of the mobile device, and the universal international dialing format comprises "+", a country code, an area code, and a phone number;
      accessing a dialed number from the phone book using a processor on the mobile device;
      determining a current location of the mobile device;
      determining a destination format based on the current location;

reformatting the dialed number from the universal international dialing format into the determined destination format; and
sending the result of the reformatting to a dialer.

16. The computer-readable storage device of claim 15, wherein the result of the reformatting is the dialed number if reformatting is not possible.

17. The computer-readable storage device of claim 15, further comprising breaking the dialed number into a set of parts, comprising one or more of: a dialing prefix, a country code, a carrier code, an STD code, an area code, a phone number, and an extension.

18. The computer-readable storage device of claim 17, further comprising using a template based on the original location to recognize how to break the dialed number into a set of parts.

19. The computer-readable storage device of claim 17, further comprising using a template based on the current location to recognize how to reformat the parts of the dialed number into the reformatted number.

20. The computer-readable storage device of claim 15, further comprising using one or more of the current location, a number format repository, and user input to provide one or more of a dialing prefix, a country code, a carrier code, an STD code, an area code, or an extension in order to reformat the dialed number in accordance with the current location.

21. A method for automatically formatting a telephone number based on location information, comprising:
    in a mobile device:
        transforming numbers in a phone book of a user from their original format into a universal international dialing format, wherein the original format is associated with an original location of the mobile device, and the universal international dialing format comprises "+", a country code, an area code, and a phone number;
        accessing a dialed number from the phone book using a processor on the mobile device;
        determining a destination format based on a determination of a current location of the mobile device;
        reformatting the dialed number from the universal international dialing format into the determined destination format; and
        sending the result of the reformatting to a dialer.

22. The method of claim 21, wherein the transforming of the numbers in the phone book comprises:
    for a corresponding number in the phone book:
        detecting the original format associated with the corresponding number based on one of the original location of the mobile device or a country designated by the user and associated with the corresponding number in the phone book;
        decomposing the corresponding number using one of a plurality of decomposition templates, based on the detected original format, to generate at least a country code and a phone number associated with the corresponding number; and
        generating a universal international dialing number for the corresponding number, based on the generated country code and the phone number associated with the corresponding number.

* * * * *